United States Patent
Fuchs et al.

(10) Patent No.: US 9,252,637 B2
(45) Date of Patent: Feb. 2, 2016

(54) COIL RETAINER FOR ELECTRIC MACHINE ROTORS

(71) Applicant: GM GLOBAL TECHNOLOGY OPERATIONS LLC, Detroit, MI (US)

(72) Inventors: Micah Joel Fuchs, Detroit, MI (US); Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 13/870,034

(22) Filed: Apr. 25, 2013

(65) Prior Publication Data

US 2014/0319958 A1    Oct. 30, 2014

(51) Int. Cl.
*H02K 3/48* (2006.01)
*H02K 3/52* (2006.01)

(52) U.S. Cl.
CPC . *H02K 3/48* (2013.01); *H02K 3/527* (2013.01)

(58) Field of Classification Search
CPC ......... H02K 3/48; H02K 3/487; H02K 3/493; H02K 1/28
USPC .......................................................... 310/214
See application file for complete search history.

(56) References Cited

U.S. PATENT DOCUMENTS

| 3,038,093 | A | * | 6/1962 | Needham et al. | 310/214 |
| 5,140,204 | A | * | 8/1992 | Cashmore et al. | 310/214 |
| 2002/0074871 | A1 | * | 6/2002 | Kikuchi et al. | 310/214 |
| 2009/0289520 | A1 | * | 11/2009 | Takeshita et al. | 310/214 |
| 2012/0025639 | A1 | * | 2/2012 | Zywot et al. | 310/214 |
| 2012/0175977 | A1 | * | 7/2012 | Beatty et al. | 310/58 |

\* cited by examiner

*Primary Examiner* — Michael Andrews
(74) *Attorney, Agent, or Firm* — Quinn Law Group, PLLC

(57) ABSTRACT

A coil retainer for a rotor includes a flat body and a longitudinal spine. The flat body has a first thickness and the longitudinal spine has a second thickness greater than the first thickness. The coil retainer may also include a central rib, which has a third thickness. The central rib runs laterally relative to the flat body and the third thickness of the central rib is greater than the first thickness.

13 Claims, 3 Drawing Sheets

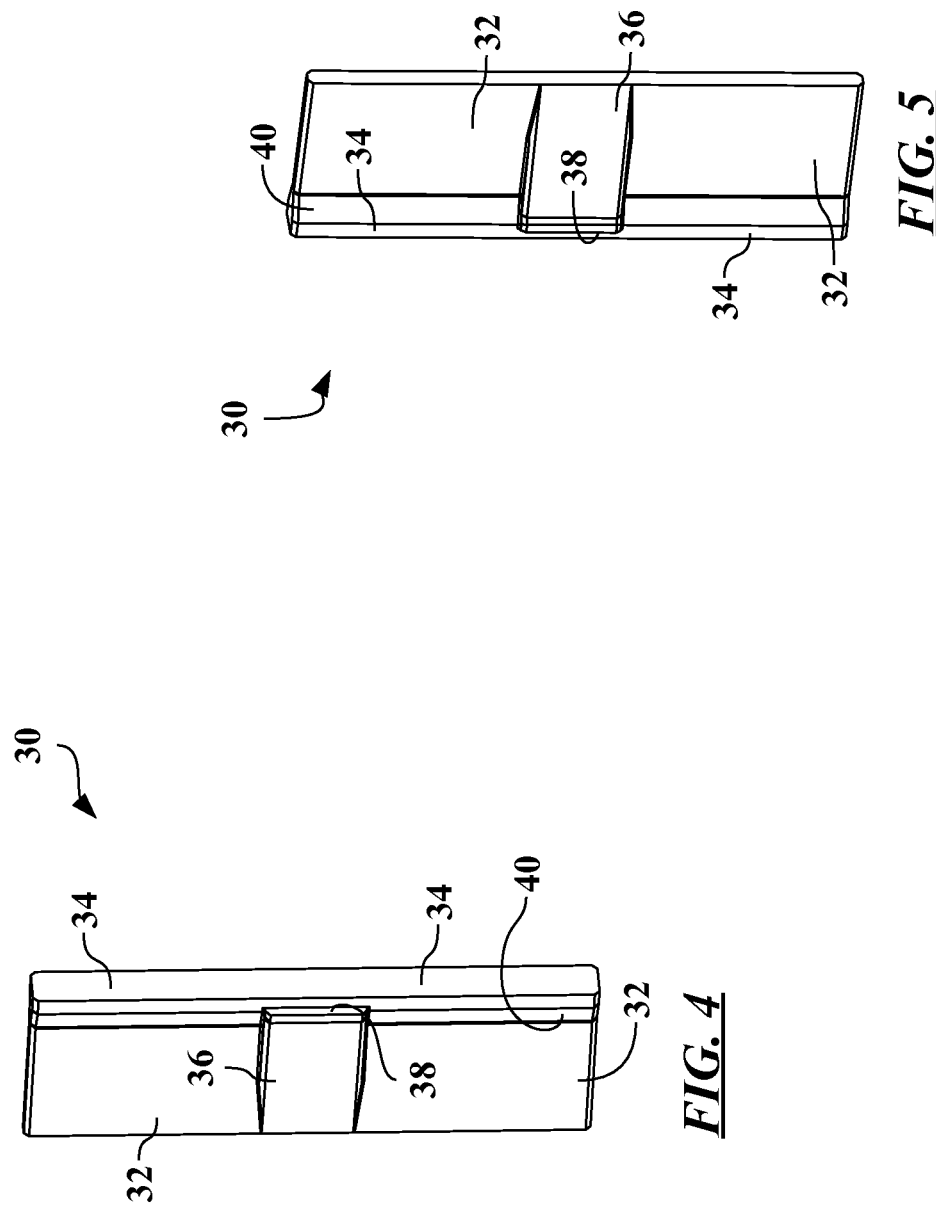

COIL RETAINER FOR ELECTRIC MACHINE ROTORS

TECHNICAL FIELD

This disclosure relates to wound rotors used in electric machines.

BACKGROUND

A stator is the stationary part of an electric machine. The stator interacts with a rotor, which is the moving or rotating part of the electric machine. The stator and rotor allow the electric machine to convert mechanical energy to electrical energy (generator mode) and to convert electrical energy to mechanical energy (motor mode).

SUMMARY

A coil retainer is provided for a rotor, such as those used in electric machines. The coil retainer includes a flat body and a longitudinal spine. The flat body has a first thickness and the longitudinal spine has a second thickness greater than the first thickness. The coil retainer may also include a central rib, which has a third thickness. The central rib runs laterally relative to the flat body and the third thickness of the central rib is greater than the first thickness.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 4 is a schematic, isometric view of one of the coil retainers for the rotor shown in FIG. 1; and FIG. 5 is another schematic, isometric view of the coil retainers shown in FIG. 4.

DETAILED DESCRIPTION

Figure 1:
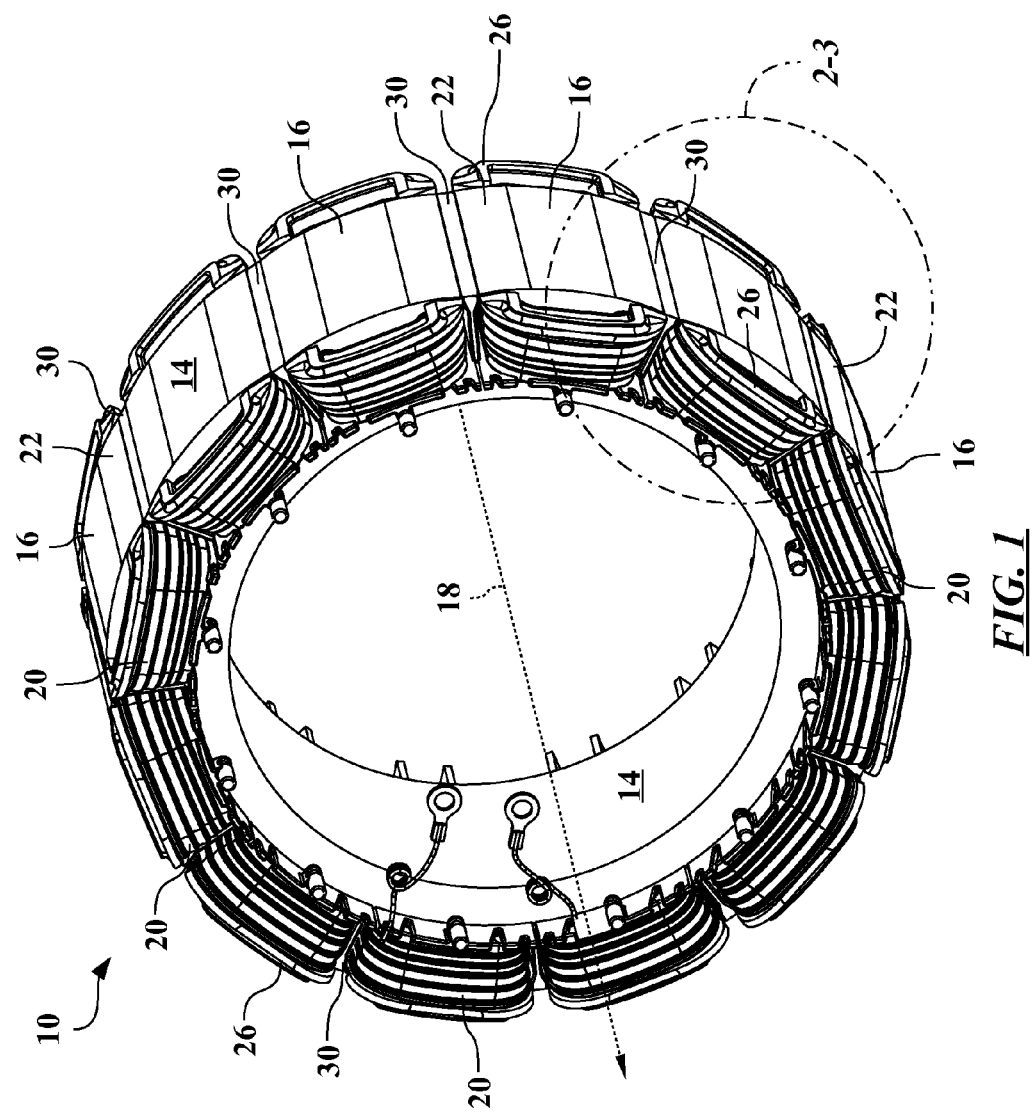
FIG. 1 is a schematic, isometric view of a rotor having concentric windings.
Figure 2:
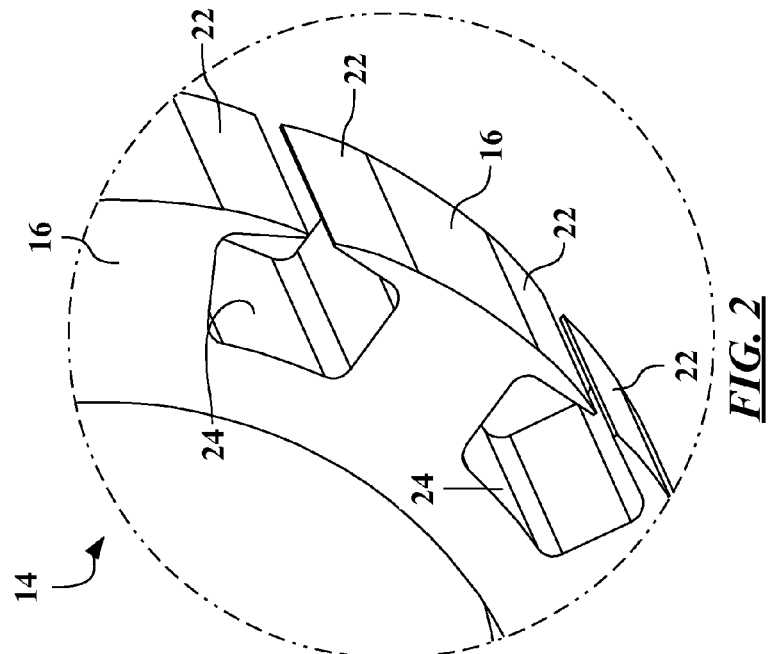
FIG. 2 is a schematic, detail view of a core of the rotor shown in FIG. 1.

Referring to the drawings, like reference numbers correspond to like or similar components wherever possible throughout the several figures. FIG. 1 and FIG. 2 show schematic views of a rotor 10, which may be used in an electric machine (not shown). The rotor 10 shown in FIG. 1 and FIG. 2 is an internal, wound rotor, which cooperates with an external stator (not shown) in the electric machine. FIG. 1 shows an isometric view of the rotor 10, substantially assembled.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The rotor 10 includes a core 14, which has a plurality of rotor teeth 16. The core 14 may be disposed radially outward of a hub (not shown), relative to an axis 18 of the rotor 10. The core 14 shown is formed as a solid, one-piece core, but may alternatively be formed as a segmented core or as a laminated (axially-layered) core, and may be formed of powdered metal, cast, or machined.

The rotor 10 rotates about the axis 18 during operation of the electric machine. The stator of the electric machine would share substantially the same axis 18. For cylindrical coordinates, in addition to the axis 18, the rotor 10 also defines a radial direction, which extends perpendicularly from the axis 18 toward the exterior portions of the rotor 10, and an angular axis or a tangential axis, which is in the direction of rotation about the radial direction. Axial movement occurs generally parallel to the axis 18, and radial movement occurs generally perpendicular to the axis 18.

Figure 3:
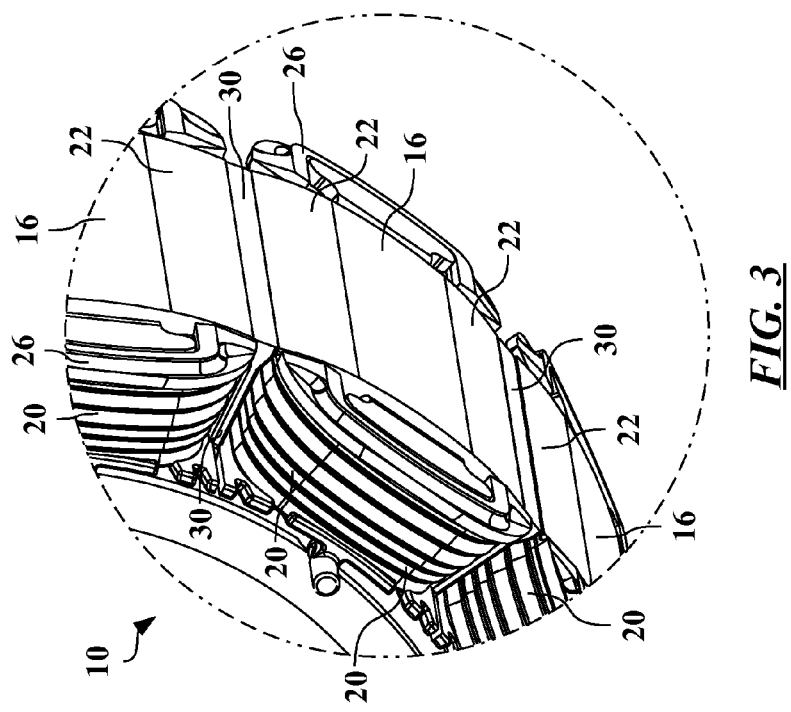
FIG. 3 is a schematic, detail view of the rotor of FIG. 1, showing coil retainers between the windings of adjacent rotor poles.

Referring to FIG. 2 and to FIG. 3, and with continued reference to FIG. 1, there are shown additional views of portions of the rotor 10. FIG. 2 shows a detail view of only the core 14 of the rotor 10 taken from a similar view to area 2-3 of FIG. 1, and FIG. 3 shows a detail view of a portion of the rotor 10, taken from a similar view to area 2-3 of FIG. 1. As viewed in FIG. 2, the teeth 16 of the core 14 provide base structure about which a plurality of windings 20 are wrapped.

The windings 20 extend axially beyond the core and fill much of the gap between adjacent teeth 16. The windings 20 are generally formed from individual wires or conductors that are looped or wrapped around the insulated rotor teeth 16. The windings 20 may be formed from round, rectangular, or square wires. Each individual tooth 16 and the windings 20 wrapped about the tooth 16 acts as one electric and magnetic pole of the rotor 10.

As viewed in FIG. 2, the radially outward portions of the teeth 16 include ledges 22. The windings 20 are wrapped around the teeth 16 radially inward from the ledges 22 and fill or cap much of a plurality of gaps 24 between adjacent teeth 16. However, some space remains between the windings 20 (as viewed in FIG. 3) and also between the ledges 22. The gaps 24 include all of the space between the teeth 16. In the configuration illustrated in FIG. 2, the gaps 24 have a cross section resembling a five-sided polygon.

As viewed in FIG. 1 and FIG. 3, the rotor 10 shown also includes a plurality of bobbin rings or bobbins 26, each of which substantially surrounds one of the rotor teeth 16. The bobbins 26 may provide an insulating layer between the windings 20 and the rotor teeth 16, and may provide radial structural support for the windings 20. Therefore, as the rotor 10 rotates at high speed about the axis 18, the ledges 22 and the bobbins 26 resist movement of the windings 20 radially outward due to radially loading (centrifugal force) from the rotation.

A plurality of coil retainers 30 are disposed between adjacent windings 20 wrapped around adjacent teeth 16. The coil retainers 30 may be formed from substantially-nonmagnetic materials. If the coil retainers 30 are substantially nonmagnetic, such that the coil retainers 30 may not significantly alter the magnetic response of the windings 20 during operation of the rotor 10 in the electric machine. The bobbins 26 may also be formed from nonmagnetic or insulating materials.

The coil retainers 30 function to divide and separate adjacent sets of windings 20. Furthermore, the coil retainers 30 function to prevent movement of the wires forming the windings 20, particularly during high-speed operation. As the rotor 10 spins at high speed, the windings 20 are pushed radially outward against the ledges 22 and, if included, the bobbins 26. The windings 20 may have a tendency to move or shift in response to the retention forces from the teeth 16 and may move into the space between adjacent windings 20. However, the coil retainers 30 provide reaction force to the windings 20 and prevent the wires or coils from shifting.

Depending on the shape of the coil retainers 30, the windings 20, and the teeth 16, the coil retainers 30 may be assembled by inserting the coil retainers axially between the windings 20 or radially. The embodiment of the coil retainers 30 shown in the figures is particularly suited for axial insertion between the windings 20 and the teeth 16. Generally, the coil retainers shown in the figures are symmetric and the same coil retainers 30 may be inserted into any of the gaps between the windings 20.

The coil retainers 30 may be formed from polymeric materials or reinforced polymeric materials. In order to provide electrical and magnetic insulation, the coil retainers 30 are formed from non-ferrous materials.

For example, and without limitation, the coil retainer 30 may be formed from PPS, glass-filled PPS, or another polymer able to withstand temperatures of the rotor 10 during operation. In the rotor 10 shown, the coil retainers 30 are formed from a material that is strong, chemical-resistant, and heat-resistant. The bobbins 26 may be formed from the same or similar material as the coil retainers 30, or may alternatively be formed from other non-ferrous materials.

Referring now to FIG. 4 and to FIG. 5, and with continued reference to FIGS. 1-3, there are shown two additional views of the coil retainers 30. FIGS. 4 and 5 show opposing isometric views of any of the coil retainers 30 show in FIG. 1 or FIG. 3. Note that the coil retainers 30 are shown from radial viewpoints in FIGS. 4 and 5, as opposed to the generally axial viewpoint of FIGS. 1-3.

As shown in FIGS. 4 and 5, the coil retainer 30 includes a planar body or flat body 32 having a first thickness, a longitudinal spine 34 having a second thickness, and a central rib 36 having a third thickness. In the embodiment shown, the longitudinal spine 34 spans the entire longitudinal length of the flat body 32 and the central rib 36 spans laterally across the flat body 32, such that the central rib 36 is substantially perpendicular to the longitudinal spine 34.

Furthermore, in the embodiment of the coil retainer 30 shown, the central rib 36 is symmetric about the flat body 32, such that the central rib 36 extends from both sides of the flat body 32. Therefore, the coil retainers 30 may be inserted axially between windings 20 without regard to the orientation of the coil retainers 30.

The coil retainer 30 includes at least one locking shelf 38 formed on the central rib 36. The locking shelf 38 is formed near the longitudinal spine 34 and abuts the inward side of the ledges 22 of the teeth 16. Therefore, radial loads on the coil retainer 30 will not cause the coil retainer 30 to move away from the axis 18, as the ledges 22 of the teeth 16 will react the radial loads though the locking shelf 38.

Because the embodiment of the coil retainer 30 shown is symmetric, the locking shelf 38 is formed on both sides of the flat body 32. However, particularly in embodiments of the rotor 10 where the teeth 16 are not symmetric, the coil retainer 30 may be formed with only one locking shelf 38 and the central rib 36 may extend from only one side of the flat body 32.

As shown in FIGS. 4 and 5, the second thickness of the longitudinal spine 34 is greater than the first thickness of the flat body 32, and the third thickness of the central rib 36 is greater than both the first thickness of the flat body 32 and the second thickness of the longitudinal spine 34. In the embodiment of the coil retainer 30 shown in the figures, the central rib 36 is tapered from the third thickness at the locking shelf 38—adjacent or proximal to the longitudinal spine 34—to the first thickness at the opposite edge of the flat body 32—distal to the longitudinal spine 34. However, the specific geometry shown is not required.

The coil retainer 30 shown also includes a wedge 40 transitioning between the flat body 32 and the longitudinal spine 34. The wedge 40 tapers from the second thickness of the longitudinal spine 34 to the first thickness of the flat body 32.

The coil retainer 30 may be formed from a single material as a unitary body or element having one-piece construction. Therefore, all of the features of the coil retainer 30 are formed as one piece, instead of being formed as separate pieces that are then attached, and require no attachment between the elements.

In the coil retainer 30 shown, the second thickness of the longitudinal spine 34 is substantially equal to the gap between adjacent ledges 22 of the teeth 16. Therefore, the longitudinal spine 34 substantially fills the gap between teeth 16. Furthermore, the third thickness of the central rib 36—which is measured at its maximum, the point at which the central rib 36 joins or forms the locking shelf 38—may be substantially equal to a gap between adjacent concentric windings 20, such that a portion of the coil retainer 30 contacts the windings 20.

The rotor 10, or a substantially-similar rotor, has been tested with and without the coil retainers 30 between the windings 20. At rotational speeds in excess of 3000 revolutions per minute (RPM), the rotor 10 without the coil retainers 30 experienced movement of some of the conductors forming the windings 20. The windings 20 experienced movement in both the radial and axial directions. However, the rotor 10 having the coil retainers 30 did not experience movement of the windings 20 at speeds in excess of 7000 RPM. Therefore, the coil retainers 30 prevented, limited, or reduced movement of the windings 20 when the rotor 10 was spinning at high speed.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A coil retainer for a rotor, comprising:
   a flat body having a first thickness;
   a longitudinal spine having a second thickness greater than the first thickness; and
   a central rib having a third thickness greater than the first thickness, wherein the central rib runs laterally relative to the flat body and wherein the central rib is located at the axial center of the coil retainer and extends over only a portion of the axial length of the coil retainer.

2. The coil retainer of claim 1, further comprising:
   a locking shelf formed on the central rib.

3. The coil retainer of claim 2, wherein the central rib is symmetric about the flat body, such that the central rib extends from two sides of the flat body and the locking shelf is formed on both sides of the flat body.

4. The coil retainer of claim 3, wherein the central rib is tapered from the third thickness proximal the longitudinal spine to the first thickness distal to the longitudinal spine.

5. The coil retainer of claim 4, wherein the longitudinal spine spans the entire longitudinal length of the flat body.

6. The coil retainer of claim 5, further comprising:
a wedge transitioning between the flat body and the longitudinal spine.

7. The coil retainer of claim 6, wherein the coil retainer is formed as a one-piece element and is formed from a non-ferrous material.

8. The coil retainer of claim 7, wherein the coil retainer is formed from a glass-filled polymer.

9. A rotor configured to rotate about an axis, comprising:
a core radially encircling the axis;
a plurality of rotor teeth extending radially outward from the core;
a plurality of concentric windings wrapped around each of the rotor teeth; and
a coil retainer, having:
a flat body having a first thickness;
a longitudinal spine having a second thickness greater than the first thickness; and
a central rib having a third thickness greater than the first thickness and greater than the second thickness, wherein the central rib is located at the axial center of the coil retainer and extends over only a portion of the axial length of the coil retainer.

10. The rotor of claim 9, wherein the second thickness of the longitudinal spine is substantially equal to a gap between adjacent rotor teeth.

11. The rotor of claim 10, further comprising:
a central rib formed on the coil retainer, wherein the central rib has a third thickness greater than the first thickness and greater than the second thickness.

12. The rotor of claim 11, wherein the third thickness of the central rib is substantially equal to a gap between adjacent concentric windings.

13. The rotor of claim 12, wherein the central rib is tapered from the third thickness adjacent the longitudinal spine to the first thickness at the opposite edge of the flat body.

* * * * *